A. L. PUTNAM.
METALLIC VEHICLE WHEEL.
APPLICATION FILED AUG. 21, 1916.
1,255,928.
Patented Feb. 12, 1918.
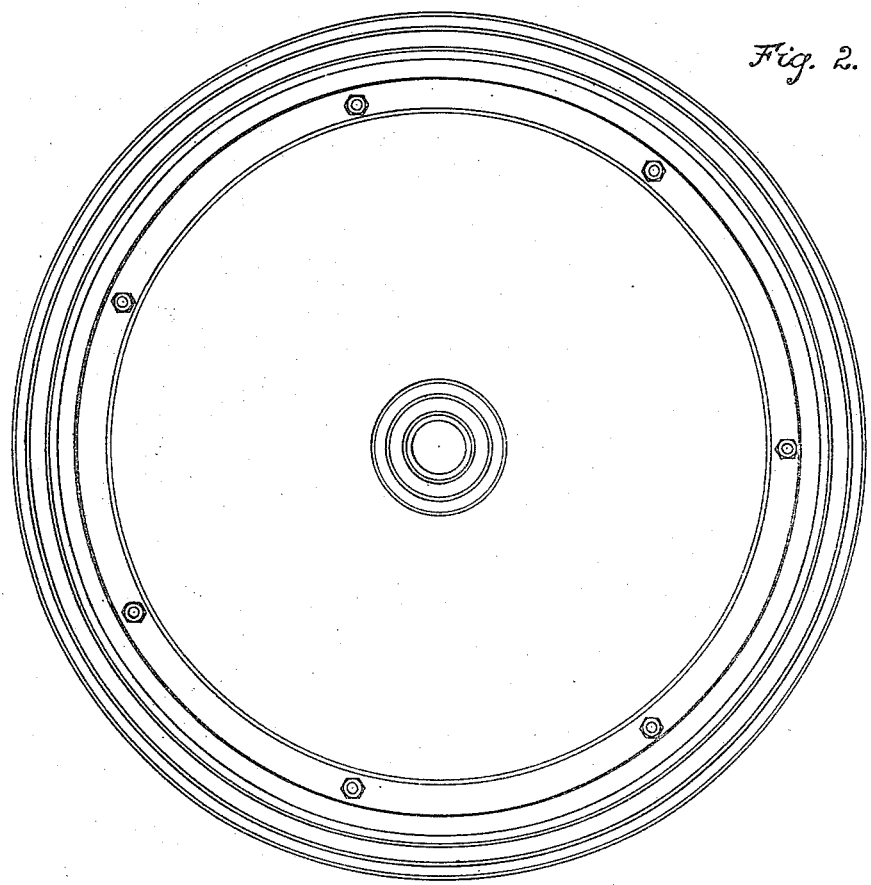
Fig. 2.
Fig. 1.
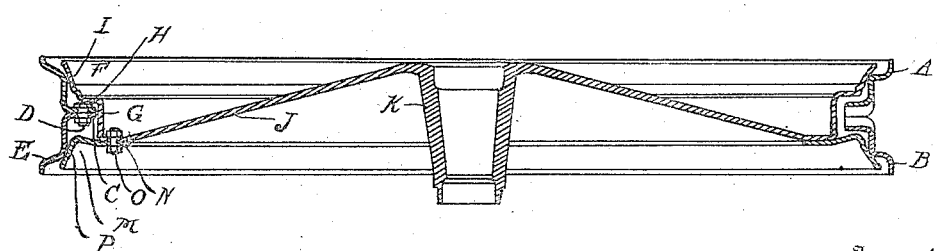
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC VEHICLE-WHEEL.

1,255,928.

Specification of Letters Patent. Patented Feb. 12, 1918.

Application filed August 21, 1916. Serial No. 116,055.

*To all whom it may concern:*

Be it known that I, ALDEN L. PUTNAM, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to metallic vehicle wheels and has particular reference, first, to a novel construction of demountable rim; second, to the means for securing said rim to the body of the wheel; and third, to the novel construction of the wheel body.

In the drawings:

Figure 1 is a central section through the wheel;

Fig. 2 is a side elevation thereof.

The demountable rim which forms one feature of my invention comprises two complementary rim sections A and B, which meet in the central plane of the wheel and are provided with inwardly-extending flanges C detachably secured to each other by clamping bolts D. Each section of the rim is provided with an outwardly-extending flange E, which is suitably fashioned to form a seat for the tire case. Thus in mounting the tire upon the rim it is only necessary to engage the rim sections therewith from opposite sides and then bolt the flanges C together.

For mounting the demountable rim upon the body of the wheel the latter is provided with a rim F having a portion G thereof sufficiently restricted in diameter to permit of placing the demountable rim with its inwardly-extending flanges C thereabout. The rim is further provided with an outwardly-extending portion H beyond the portion G and a flaring portion I beyond the portion H, said flaring portion forming a seat for one edge of the demountable rim. The rim F is preferably formed integral with the central portion of the wheel, which as shown comprises a dished metallic disk J. K is a hub at the center of the disk, which may be formed integral therewith, but of a heavier gage, so as to provide the necessary strength. The disk J is also preferably of tapering gage, being thickest at the center and gradually tapering toward the periphery. M is an annular flange for securing the demountable rim, said flange having an inwardly-extending portion N, which is detachably clamped to the disk body by bolts O, and which has an outwardly-extending portion corresponding to the portion H of the flange F and a flaring portion P corresponding to the flaring portion I. This flaring portion forms a seat for the opposite edge of the demountable rim and when the flange M is secured by the bolts O the demountable rim is securely fastened.

What I claim as my invention is:—

1. A wheel, comprising a hub portion, a body portion in the form of a disk secured to said hub, a rim formed integral with said body portion and comprising a seat portion for one edge of a demountable rim and a central recess, and an annular member detachably engaging said body portion, forming a seat for said demountable rim on the opposite side of said central recess.

2. A wheel, comprising a hub portion, a body portion formed of a disk secured to said hub, a rim formed integral with said body portion, comprising a laterally-extending portion, an outwardly-extending portion and a flaring portion, the latter forming a seat for a demountable rim, and an annular member detachably engaging said body portion, providing an outwardly-extending portion and a flaring portion, the latter forming a seat for the opposite side of said demountable rim.

3. A vehicle wheel, comprising a hub portion, a body portion in the form of a disk extending outward from one end of said hub, a rim at the outer end of said body portion, comprising a laterally-extending portion, an outwardly-extending portion and a flaring portion, a detachable member secured to said body portion and having an outwardly-extending portion and a flaring portion, and a demountable rim, comprising complementary sections engageable with the tire from opposite sides thereof, being provided with inwardly-extending flanges and clamping means therefor, said flanges and clamping means engaging a space between the outwardly-extending portions of the rim and said flaring portions forming seats for said demountable rim.

In testimony whereof I affix my signature.

ALDEN L. PUTNAM.